United States Patent
Panza

(10) Patent No.: US 11,154,810 B2
(45) Date of Patent: Oct. 26, 2021

(54) METHOD FOR REVAMPING A CO2 REMOVAL SECTION FOR PURIFICATION OF A HYDROGEN-CONTAINING GAS

(71) Applicant: Casale SA, Lugano (CH)

(72) Inventor: Sergio Panza, Como (IT)

(73) Assignee: Casale SA, Lugano (CH)

( * ) Notice: Subject to any disclaimer, the term of this patent is extended or adjusted under 35 U.S.C. 154(b) by 566 days.

(21) Appl. No.: 15/753,499

(22) PCT Filed: Aug. 8, 2016

(86) PCT No.: PCT/EP2016/068863
§ 371 (c)(1),
(2) Date: Feb. 19, 2018

(87) PCT Pub. No.: WO2017/029145
PCT Pub. Date: Feb. 23, 2017

(65) Prior Publication Data
US 2018/0243683 A1    Aug. 30, 2018

(30) Foreign Application Priority Data
Aug. 19, 2015    (EP) .................................... 15181571

(51) Int. Cl.
*B01D 53/18*    (2006.01)
*B01D 53/14*    (2006.01)
(Continued)

(52) U.S. Cl.
CPC .............. *B01D 53/185* (2013.01); *B01D 3/06* (2013.01); *B01D 19/0015* (2013.01);
(Continued)

(58) Field of Classification Search
None
See application file for complete search history.

(56) References Cited

U.S. PATENT DOCUMENTS 5,281,254 A    1/1994    Birbara et al.
6,929,680 B2 *    8/2005    Krushnevych ............ C10L 3/08
                                                                95/93
(Continued)

FOREIGN PATENT DOCUMENTS

CH    680908 A5    12/1992
FR    2474887 A1    8/1981
(Continued)

OTHER PUBLICATIONS

International Search Report dated Oct. 18, 2016 in connection with PCT/EP2016/068863.
(Continued)

*Primary Examiner* — T. Bennett McKenzie
*Assistant Examiner* — Phillip Y Shao
(74) *Attorney, Agent, or Firm* — Akerman LLP

(57) ABSTRACT

A method for revamping a CO2 removal section for removing carbon dioxide from a hydrogen-containing synthesis gas, wherein the CO2 removal section comprises an absorption section (2) wherein carbon dioxide is transferred to an absorbing solution and a stripping tower (3) for regeneration of the CO2-loaded solution, said stripping tower comprising an upper zone (4) where a first gaseous CO2 stream (10) and a partially regenerated semi-lean solution (11) are produced, and a lower zone (5) acting as a stripping zone where a second gaseous CO2 stream (12) and a lean regenerated solution are produced, the second CO2 stream (12) being a substantially pure stream containing less hydrogen and impurities than the first CO2 stream, and wherein the method of revamping provides the installation of sealing means (16) inside the stripping tower (3), arranged to isolate said second gaseous CO2 stream (12) from the first stream (10), so that the second stream (12) can be exported separately.

9 Claims, 3 Drawing Sheets

(51) Int. Cl.
*C01B 3/52* (2006.01)
*B01D 19/00* (2006.01)
*B01D 3/06* (2006.01)
*C01B 32/50* (2017.01)

(52) U.S. Cl.
CPC ..... *B01D 19/0036* (2013.01); *B01D 53/1418* (2013.01); *B01D 53/1425* (2013.01); *B01D 53/1475* (2013.01); *B01D 53/18* (2013.01); *C01B 3/52* (2013.01); *C01B 32/50* (2017.08); *B01D 2257/504* (2013.01); *C01B 2203/0415* (2013.01); *C01B 2203/0475* (2013.01); *C01B 2203/061* (2013.01); *Y02C 20/40* (2020.08); *Y02P 20/151* (2015.11); *Y02P 70/10* (2015.11)

(56) References Cited

U.S. PATENT DOCUMENTS

| | | | |
|---|---|---|---|
| 9,895,648 B2 * | 2/2018 | Seiki | .......... C01B 32/50 |
| 2001/0027858 A1 | 10/2001 | Gallarda | |
| 2005/0000360 A1 | 1/2005 | Mak et al. | |
| 2011/0120309 A1 | 5/2011 | Baburao et al. | |
| 2012/0097027 A1 | 4/2012 | Gunther | |

FOREIGN PATENT DOCUMENTS

| | | |
|---|---|---|
| RU | 2485048 C2 | 6/2013 |
| RU | 2526455 C2 | 8/2014 |

OTHER PUBLICATIONS

International Preliminary Report on Patentability dated Nov. 29, 2017, in connection with PCT/EP2016/068863.
Written Opinion of the International Searching Authority issued in connection with PCT/EP2016/068863.
Response to Written Opinion of the International Searching Authority dated Jun. 19, 2017 in connection with PCT/EP2016/068863.
Weiss, H., "Rectisol Wash for Purification of Partial Oxidation Gases", Gas Separation & Purification, vol. 2, No. 4, Dec. 1, 1988, pp. 171-176.

* cited by examiner

METHOD FOR REVAMPING A CO2 REMOVAL SECTION FOR PURIFICATION OF A HYDROGEN-CONTAINING GAS

This application is a national phase of PCT/EP2016/068863, filed Aug. 8, 2016, and claims priority to EP 15181571.9, filed Aug. 19, 2015, the entire contents of both of which are hereby incorporated by reference.

FIELD OF THE INVENTION

The present invention relates to the field of plants for the production of a hydrogen-containing synthesis gas and their revamping. More in detail, the invention relates to the carbon dioxide removal section and a method of revamping thereof.

PRIOR ART

The production of a hydrogen-containing synthesis gas is known in the art, for example to produce a synthesis gas (make-up gas) for the industrial production of ammonia, namely comprising hydrogen ($H_2$) and nitrogen ($N_2$) in a suitable ratio of about 3:1.

A plant for the production of a hydrogen-containing synthesis gas basically comprises a hydrocarbon reforming section for the production of a raw syngas and a purification section. The reforming section may include a primary steam reformer and a subsequent secondary reformer fired with air, enriched air or pure oxygen. The purification section typically includes a shift converter wherein CO is converted into CO2, a CO2 removal section and optionally a methanator.

Removal of the CO2 is performed to purify the synthesis gas. For example, in an ammonia plant the carbon dioxide would negatively affect the ammonia production. The separated CO2 may be used for another industrial process, as in the case of integrated ammonia/urea plants where the hydrogen-containing synthesis gas is used to produce ammonia and the recovered CO2 is used together with ammonia for the synthesis of urea.

According to the prior art, a CO2 removal section generally comprises an absorbing section where CO2 is removed from the synthesis gas by means of an absorbing solution, e.g. an aqueous solution of an alkanolamine, producing a a CO2-rich solution (loaded solution). The removal section also comprises a regeneration section where the loaded solution is regenerated by separating gaseous CO2 which is exported. The regeneration section includes a flashing zone and a stripping zone arranged in a tower, the flashing zone being located above the stripping zone.

The loaded solution is first flashed in the flashing zone to a relative pressure of 0.2 to 1 bar(g). The symbol bar(g) (bar gauge) denotes the pressure reading relative to current atmospheric pressure. Said flashing causes the release of about 15-25% of the carbon dioxide originally contained in the loaded solution, as well as substantially all the hydrogen, and other components dissolved in the solution, including methane, nitrogen, carbon monoxide and argon. Hence, the flashing step produces a first gaseous stream comprising carbon dioxide, a significant amount of hydrogen, and small amounts of other components like nitrogen, methane, CO, argon.

The so obtained semi-lean solution is then subjected to stripping in the underlying stripping zone where the remaining 75-85% of the carbon dioxide is released. Accordingly, the stripping produces a second gaseous stream comprising carbon dioxide and only minor amounts of hydrogen and other impurities.

For example, the first stream may contain about 2.5% molar of hydrogen while the second stream typically contains about 500 ppm (0.05% mol) of hydrogen.

In the prior art, the second stream of "clean" carbon dioxide emerging from the stripping zone mixes with the first stream flashed in the upper zone, producing the CO2-containing stream which is actually exported. Then, the substantially pure and low-hydrogen second stream is contaminated with the first stream, leading to export of a gaseous CO2 containing a non-negligible amount of hydrogen, e.g. around 5000 ppm (0.5% molar), as well as other impurities. This content of hydrogen is undesirable because it may lead to formation of explosive mixtures, especially in an ammonia-urea plant where the CO2 gas is used for the synthesis of urea. More generally, the relatively high content of hydrogen and impurities makes the CO2 stream less suitable for other uses, for example in the food industry, then reduces the value of the exported CO2.

A prior-art solution to this problem is performing the flashing and the stripping in two separate vessels, withdrawing two separate currents of gaseous CO2. However a disadvantage of this solution is the need of two pressure vessels and an additional pump, which increases the capital cost and makes this solution less attractive especially when revamping an existing plant.

SUMMARY OF THE INVENTION

The aim of the invention is to solve the above problems. In particular, the invention aims to obtain a low-hydrogen or substantially hydrogen-free CO2 stream from the regeneration of the absorbing solution, without the need to install two separate pressure vessels. In particular, the invention aims to provide a cost-effective method for revamping the CO2 removal section of a plant for the production of a hydrogen-containing synthesis gas, obtaining carbon dioxide with low content of hydrogen and impurities and, as such, suitable for industrial use.

This aim is reached with a method for revamping a CO2 removal section for removing carbon dioxide from a hydrogen-containing synthesis gas according to claim 1. Preferred features of the invention are stated in the dependent claims.

The invention provides the revamping of a CO2 removal section comprising:

an absorption section wherein carbon dioxide is removed from the synthesis gas by absorption in an absorbing solution resulting in a CO2-rich solution, a stripper for the regeneration of the CO2-rich solution, comprising an upper zone wherein said solution coming from the absorption section is flashed producing a first gaseous stream containing CO2 and a partially regenerated semi-lean solution, and a lower zone acting as a stripping zone, wherein the semi-lean solution is stripped producing a second gaseous stream containing CO2 and a lean regenerated solution, and wherein said second gaseous stream having a hydrogen content which is lower than said first gaseous stream.

Said section is revamped by providing sealing means arranged to isolate said second gaseous stream from said first gaseous stream and to export said first stream and second stream separately from the stripper.

Preferably said sealing means are obtained by partitioning the upper zone into a flashing zone and a chamber. In a greater detail, the CO2-rich solution is fed to said flashing zone wherein the flashing takes place, the first gaseous stream is collected and the semi-lean solution is generated; said flashing zone communicates with the chamber via at least one aperture, such as a duct or a port for example, arranged to feed the semi-lean solution from the flashing zone to the chamber; said chamber communicates with the stripping zone so that the second gaseous stream (i.e. low-hydrogen stream of carbon dioxide) is collected into said chamber and the semi-lean solution flows from the chamber to said stripping zone.

In a preferred embodiment, said sealing means are arranged to form a gas-tight seal between the flashing zone and the stripping zone by means of a liquid level of the semi-lean solution flowing from the chamber to the stripping zone. The liquid level prevents a backflow of the low-hydrogen second stream into the flashing zone and its contamination with the first stream. The above seal is also termed a hydraulic seal.

The sealing means include a distributor facing said at least one aperture and configured to keep said at least one aperture below the liquid level of the semi-lean solution.

For example, said at least one aperture is located below an edge of a side wall of said distributor, so that during operation the level of the semi-lean solution in the distributor is above said at least one aperture.

By doing so, the semi-lean solution passes into the stripping zone by overflowing from the distributor; the second gaseous stream however cannot flow back into the flashing zone as the aperture is below the liquid level.

In a particularly preferred embodiment, said flashing zone and said chamber are delimited by providing a separation baffle in the upper zone, the flashing zone being above said baffle and the chamber being below the same. The distributor is located in the chamber, and the separation baffle has a duct acting as a feeder of the semi-lean solution into the distributor. Said duct has a bottom opening facing the distributor which remains immersed in the semi-lean solution, avoiding a backflow of the second gaseous stream through the duct into the flashing zone.

Accordingly, the method of the invention also comprises the provision of an additional nozzle communicating with said chamber for collecting the second gaseous stream.

In another preferred embodiment, said flashing zone and said chamber are delimited by providing a gas collector in the upper zone. Then, the flashing zone is defined by the inside of said gas collector and the chamber is defined outside the gas collector. The gas collector has a bottom opening facing the distributor of the semi-lean solution, and which remains immersed during operation to provide the above mentioned gas-tight seal.

In this embodiment, the method of the invention also comprises the replacement of an existing nozzle with a modified nozzle, made for instance by a spool piece, comprising separate paths for the first and second gaseous streams. Said paths are preferably coaxial, and even more preferably the inner path is in communication with the flashing zone for the collection of the first gaseous stream and the outer path is in communication with the chamber for the collection of the second gaseous stream.

An advantage of this embodiment is that the new nozzle replaces the already existing nozzle and no new opening in the vessel is required.

The main advantage of the invention is that carbon dioxide is exported from the stripper in two separate gaseous streams having different content of hydrogen and suitable for different uses. The clean CO2 stream from the stripping zone, having a low content of hydrogen and impurities, is exported separately from the CO2 stream generated in the flashing zone which typically contains more hydrogen and impurities.

Preferably, said first gaseous stream has a hydrogen content which is higher than 0.1%, more preferably in the range 1-4%, and contains an amount of carbon dioxide not exceeding 15% of the carbon dioxide previously contained in CO2-rich solution.

The second gaseous stream has preferably a hydrogen content not greater than 0.1%, more preferably in the range 0.03-0.07%, and contains at least 75% of the carbon dioxide previously contained in CO2-rich solution.

For example, the first CO2-containing stream having a significant content of hydrogen is suitable for the synthesis of methanol, while the second CO2-containing stream is preferably used for a process which require a higher degree of purity of the CO2, e.g. for the synthesis of urea or in the food industry.

A CO2 removal section according to the claims and according to the above description is also an object of the present invention.

The invention is now elucidated with the help of the drawings, which illustrate preferred embodiments by way of non-limitative examples.

DETAILED DESCRIPTION OF PREFERRED EMBODIMENTS

Figure 1:
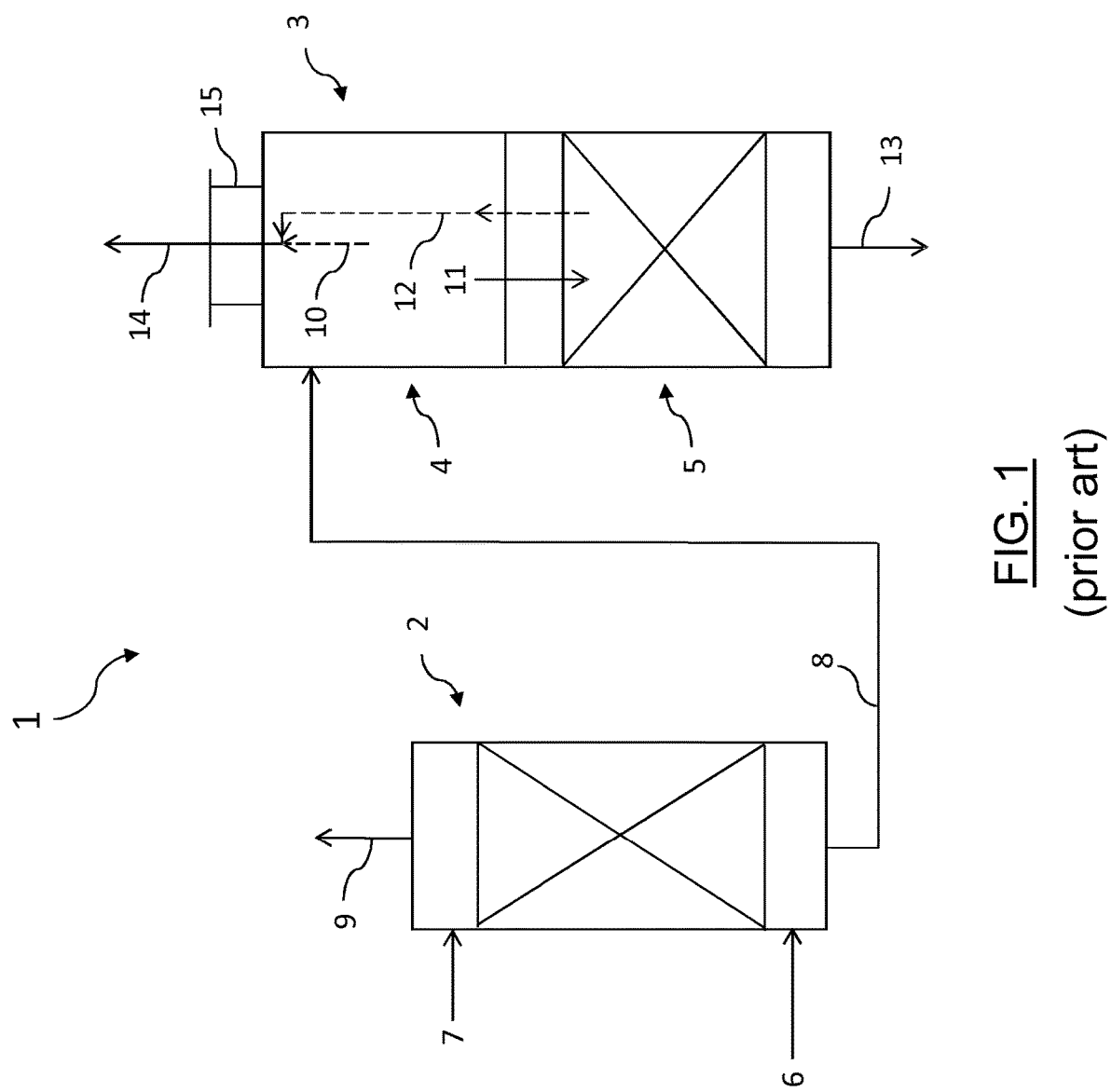
FIG. 1 is a simplified scheme of a CO2 removal section according to the prior art.

FIG. 1 illustrates a scheme of a CO2 removal section 1 of the prior art, including an absorbing section embodied with an absorber column 2 and a regeneration section embodied with a tower 3. The tower 3 comprises an upper portion 4 acting as a flashing zone and a lower portion 5 acting as a stripping zone 5.

A hydrogen-containing synthesis gas 6 is supplied to the bottom of the absorber column 2 and is contacted with an aqueous amine solution 7 flowing downward. The synthesis gas 6 is for example the product of a hydrocarbon reforming and contains some carbon dioxide to be removed.

The carbon dioxide contained in the gas 6 is absorbed by the solution 7 producing a CO2-rich solution (loaded solution) 8 and a CO2-depleted syngas 9 which is released from top of the column 2.

The loaded solution 8 is fed to the flashing zone 4 of the tower 3 where it is flashed to a pressure of 0.2 to 1 bar(g). A portion of the CO2 contained in the loaded solution 8 is released during the flashing step, to provide a first gaseous CO2 stream 10 and a partially regenerated semi-lean solution 11. The semi-lean solution 11 still contains about 75-85% of the absorbed CO2. The term of CO2 stream is used to denote a stream containing predominantly carbon dioxide. The CO2 stream 10, in particular, also contains a significant amount of hydrogen, typically around 2.5% molar.

The semi-lean solution 11 passes through the underlying stripping zone 5, where the remaining CO2 is released to provide a second gaseous CO2 stream 12 and a lean solution 13. Said second CO2 stream 12 comprises carbon dioxide and minor amounts of hydrogen of around 0.05% mol. Accordingly it can be termed a low-hydrogen or substantially hydrogen-free stream.

The gaseous stream 14 withdrawn from the nozzle 15 of tower 3 is the result of the mixing of both CO2 streams 10 and 12. Hence this stream 14 contains the hydrogen and impurities of the first stream 10, leading to an overall concentration of hydrogen which is not negligible, typically around 0.5% molar.

FIGS. 2 to 5 show the removal section 1 revamped according to some embodiments of the invention, with the addition of sealing means 16 arranged inside the upper portion 4 and suitable to isolate the streams 10 and 12, avoiding their mixing into the stream 14.

Figure 3:
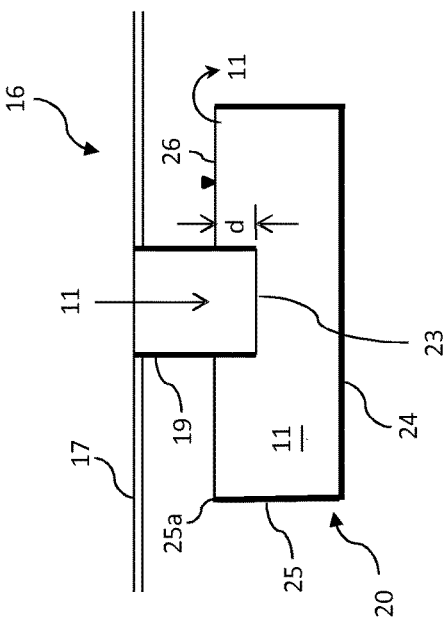
FIG. 3 is a detail of FIG. 2.
Figure 2:
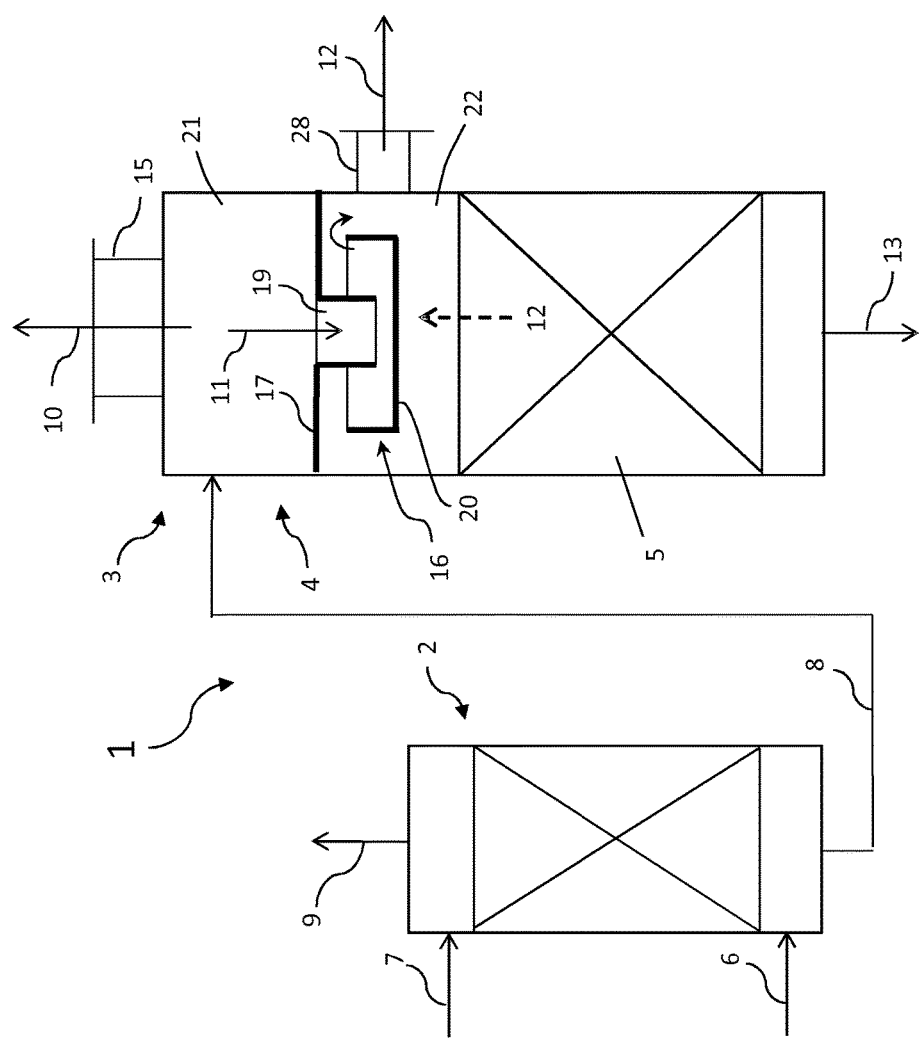
FIG. 2 is a scheme of the CO2 removal section of FIG. 1 after revamping in accordance with a first embodiment of the invention.

In FIGS. 2-3 the sealing means 16 includes a separation baffle 17 (which is one example of a partitioning means) and a distributor 20. Said baffle 17 partitions the upper portion 4 of the tower into a flashing zone 21 and a chamber 22 The flashing zone 21 is above the chamber 22. The distributor 20 is below the separation baffle 17 and then it is located in the chamber 22. The separation baffle 17 has a central duct 19 facing the distributor 20, to put the flashing zone 21 in communication with the chamber 22. The chamber 22 is in communication with the stripping zone 5, and is also in communication with the flashing zone 21 via said duct 19.

More in detail, the distributor 20 is located in the chamber 22 below the lower opening 23 of the duct 19, and above the stripping zone 5. Said distributor 20 is configured as an open-top vessel and comprises a closed bottom 24 and a lateral wall 25 (FIG. 3).

The lower opening 23 of the duct 19 is below the edge 25a of the lateral wall 25 of the distributor 20 (FIG. 3) by a distance d.

The input of the loaded solution 8 is directed into the flashing zone 21, as shown in FIG. 2.

Accordingly, the operation of said first embodiment is as follows. The loaded solution 8 enters the flashing zone 21 where it is flashed with release of the first CO2-containing gaseous stream 10 and generation of the semi-lean solution 11. Said first gaseous stream 10 exits the regeneration tower 3 from the nozzle 15.

The semi-lean solution 11 flows from the flashing zone 21 through the duct 19, fills the distributor 20 up to a maximum level 26 and overflows around the wall 25 into the stripping zone 5 below. Due to the above described arrangement of the duct 19 and distributor 20, the opening 23 remains immersed in the solution 11 below the level 26.

The substantially hydrogen-free gaseous stream 12 emerging from the stripping zone 5 fills the chamber 22 around the distributor 20, but cannot flow through the duct 19 and back to the upper flashing zone 21, due to the seal ensured by the liquid level 26 above the opening 23. Hence the distributor 20 provides a gas-tight seal (so-called hydraulic seal) of the duct 19 preventing a backflow of the stream 12 from the chamber 22 to the flashing zone 21. As a consequence, said stream 12 can be exported via a lateral nozzle 28.

The revamping procedure may include the provision of said lateral nozzle 28 when necessary, i.e. when the tower 3 has no lateral nozzle for this purpose.

In the zone 5, a stripping medium such as a hot inert gas (e.g. steam) can be used to promote the stripping of the semi-lean solution 11 and release of the second gaseous stream 12.

Figure 5:
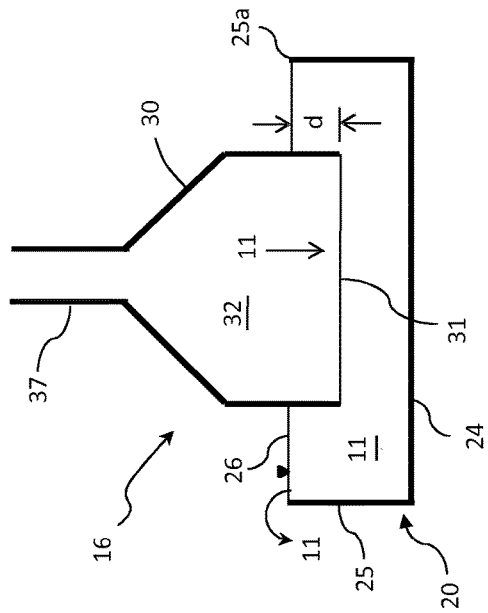
FIG. 5 is a detail of FIG. 4.
Figure 4:
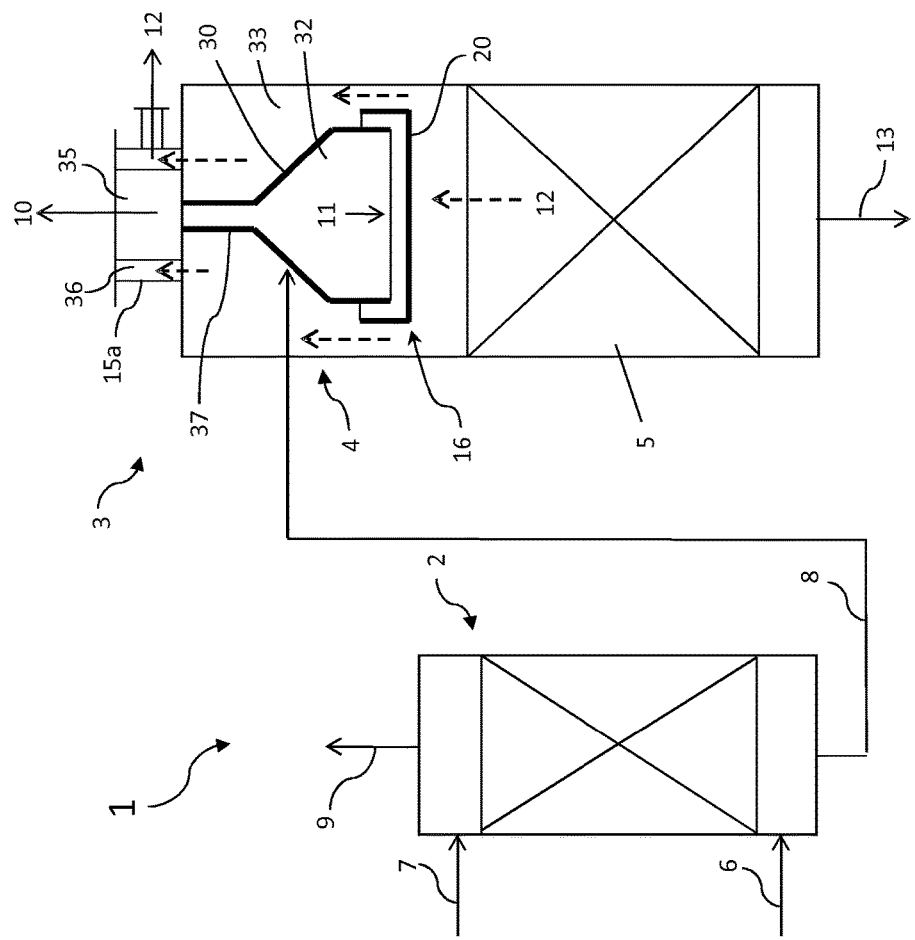
FIG. 4 is a scheme of the CO2 removal section of FIG. 1 after revamping in accordance with a second embodiment of the invention.

FIGS. 4 and 5 illustrate a second embodiment of the invention wherein the sealing means 16 includes a gas collector 30 (which is another example of a partitioning means) above the distributor 20. The items similar to those of the first embodiment are denoted with the same numerals for simplicity.

The gas collector 30 receives the loaded solution 8 and has a bottom opening 31 facing the distributor 20. Said bottom opening 31 is below the edge 25a of the lateral wall 25 of said distributor 20. Similarly to the opening 23 of the duct 19, also the bottom opening 31 of the gas collector 30, in operation, remains immersed in the liquid solution collected by the distributor 20 (FIG. 5).

Preferably, the gas collector 30 is dome-shaped as illustrated in FIG. 4.

The collector 30 delimits a flashing zone 32 in its inside wherein the flashing of the loaded solution 8 takes place, and a chamber 33 in its outside where the gaseous stream 12 is collected. The liquid level 26 in the distributor 20, as in the previously described first embodiment, provides a hydraulic seal preventing a backflow of the clean carbon dioxide 12 into the collector 30.

In this second embodiment, the revamping also provides the replacement of the original nozzle 15 with a modified nozzle 15a comprising separate paths for the gaseous streams 10 and 12. Preferably, said modified nozzle 15a comprises coaxial paths. As shown in FIG. 4, for example, the nozzle 15a comprises an inner path 35 in communication with the flashing zone 32 (i.e. the inside of collector 30) via a duct 37, and an outer path 36 in communication with the chamber 33 outside the collector 30.

Then, the stream 10 and the substantially hydrogen-free stream 12 can be exported separately. An advantage of this embodiment is that the new nozzle, made for instance by a spool piece, replaces the already existing top nozzle and no new opening on the vessel is required.

The invention claimed is:

1. A method for revamping a CO2 removal section for removing carbon dioxide from a hydrogen-containing synthesis gas, wherein:

said CO2 removal section comprises an absorption section wherein carbon dioxide is removed from the hydrogen-containing synthesis gas by absorption in an absorbing solution, obtaining a CO2-rich solution, and a stripper for regeneration of the CO2-rich solution, comprising an upper zone where said solution coming from the absorber is flashed producing a first gaseous stream containing CO2 and a partially regenerated semi-lean solution, and a lower zone acting as a stripping zone where the semi-lean solution is stripped producing a second gaseous stream containing CO2 and a lean regenerated solution, said second gaseous stream having a hydrogen content which is lower than a hydrogen content of said first gaseous stream, the method of revamping being characterized by providing sealing means arranged to isolate said second gaseous stream from said first gaseous stream and to export said first gaseous stream and second gaseous stream separately from the stripper, and in that said sealing means include partitioning means arranged to partition the upper zone into a flashing zone and a chamber, the CO2-rich solution is fed to said flashing zone wherein the flashing takes place, the first gaseous stream is collected and the semi-lean solution is generated; said flashing zone communicates with said chamber via at least one aperture arranged to feed the semi-lean solution from the flashing zone to the chamber; said chamber is in communication with the stripping zone so that the second gaseous stream is collected into said chamber and the semi-lean solution flows from the chamber to said stripping zone, wherein said partitioning means include a gas collector located in the upper zone, said flashing zone being delimited inside the gas collector and said chamber being defined outside the gas collector in the upper zone, said gas collector having a bottom opening which represents said at least one aperture for communication between the flashing zone and the chamber;

wherein said sealing means are arranged to form a gas-tight seal between said flashing zone and said stripping zone, and said gas-tight seal is provided by a liquid level of the semi-lean solution flowing from the chamber to the stripping zone.

2. The method according to claim 1, wherein the sealing means include a distributor facing said at least one aperture and configured to keep said at least one aperture below said liquid level of the semi-lean solution.

3. The method according to claim 2, said at least one aperture being located below an edge of a side wall of said distributor, so that during operation the liquid level of the semi-lean solution in the distributor is above said at least one aperture.

4. The method according to claim 1, comprising a replacement of an existing nozzle with a modified nozzle comprising separate paths for the first and second gaseous streams.

5. The method according to claim 4, wherein the modified nozzle comprises an inner path in communication with the flashing zone and an outer path in communication with the chamber, said inner and outer paths being coaxial.

6. The method according to claim 1, wherein said first gaseous stream has a hydrogen content which is greater than 0.1 w %, and said second gaseous stream has a hydrogen content which is not greater than 0.1 w %.

7. The method according to claim 1, wherein said second gaseous stream contains at least 75% of the carbon dioxide previously contained in CO2-rich solution.

8. The method according to claim 1, wherein said first gaseous stream is used for methanol synthesis and said second gaseous stream is used for urea synthesis by reaction with ammonia or in food industry.

9. The method according to claim 6, wherein said first gaseous stream has a hydrogen content which is in the range 1-4 w %, and said second gaseous stream has a hydrogen content which is in the range 0.03-0.07 w %.

* * * * *